2,974,082
Patented Mar. 7, 1961

2,974,082
PROCESS OF INHIBITING MICROORGANISMS WITH ALKYLENE BIS-DITHIOCARBAMATE ESTERS

Alfred P. Collins, Terre Haute, Ind., assignor to the State of Iowa, for the use and benefit of the State University of Iowa, Iowa City, Iowa, an educational institution of Iowa No Drawing. Filed Apr. 25, 1957, Ser. No. 654,982

6 Claims. (Cl. 167—22)

This invention relates to fungical, bactericidal and germicidal organic compounds and more particularly to fungicides comprising bis-dithiocarbamate esters and the methods of preparing the same. This is a continuation-in-part application of application Serial No. 514,105, filed June 8, 1955, now abandoned.

It is an object of this invention to provide organic compounds comprising alkylene bis-dithiocarbamate esters having new and more potent fungicidal properties than known fungicides.

Another object of this invention is to provide organic compounds comprising esters of alkylene bis-dithiocarbamic acid which have micro-organism-destroying properties and which retain such properties over long periods of time.

Still another object of this invention is to provide a fungicide which exhibits excellent activity against many fungi.

In attaining the objects of this invention, one feature resides in reacting a di-metallic salt of a bis-dithiocarbamate with an organic halide to form a bis-dithiocarbamate ester having these excellent fungicidal properties.

Another features resides in reacting a dimetallic salt of 2-hydroxytrialkylene-1, 3-bis-dithiocarbamate with an organic halide to form a 3-bis-dithiocarbamate ester having excellent micro-organism destroying properties.

Other objects, features and advantages will become more apparent from the following description of the invention.

It has been found that the condensation reaction product formed by reacting a dimetallic salt of a bis-dithiocarbamate with an organic halide has the properties of easily and quickly destroying various bacteria or fungi which are treated therewith.

In particular, it has been found that a compound having the formula $$R-S-\overset{\overset{S}{\|}}{C}-\overset{\overset{R_2}{|}}{N}-R_1-\overset{\overset{R_2}{|}}{N}-\overset{\overset{S}{\|}}{C}-S-R$$

wherein R is a radical selected from the group consisting of saturated and unsaturated hydrocarbons, saturated and unsaturated substituted hydrocarbons, and substituted and unsubstituted carbocyclic radicals, $R_1$ is a radical selected from the group consisting of alkylene, substituted alkylene, primary amines and secondary amines, and $R_2$ is a radical selected from the group consisting of hydrogen and alkyl, exhibits considerably stronger fungicidal and bactericidal activity than undecylenic acid when tested against various microorganisms by the paper disk technique.

Examples of radicals from which R may be selected include certain lower alkyls, substituted lower alkyls, allyl, substituted allyl, aralkyl, substituted aralkyl, aryl, substituted aryl, phenacyl, acetyl, benzoyl, cyclohexyl, polyethylene glycol [H(OCH$_2$CH$_2$)$_n$—] and others.

Examples of radicals from which $R_1$ may be selected include, among others, ethylene, propylene, butylene, etc., 2-hydroxy propylene, diamine and other amines wherein the nitrogen atom has at least one available hydrogen atom.

$R_2$ may be H, or radicals such as methyl, ethyl, and the like.

A compound having the above formulation has also been found to have a potent germicidal effect upon *Microsporum lanosum, Staphylococcus aureus, Microsporum audouini, Microsporum gypseum, Achorion schoenleini (Trichophyton schoenleini),* and *Trichophyton rubrum.*

The new bis-dithiocarbamate esters which exhibit these potent fungicidal and bactericidal properties are obtained by the condensation reaction of two molecules of an organic halide with one molecule of a dimetallic bis-dithiocarbamate. The condensation products thus formed are only slightly soluble in water at 25° C., but may be suspended in water by use of suspending agents such as the Tweens. The Tweens are non-ionic surface active agents which are commercially available and are derived by adding polyoxyethylene chains to the non-esterified hydroxyls of the partial esters of the common fatty acids and hexitol anhydrides derived from sorbitol. These condensation products are also soluble in varying degrees in organic solvents such as the alcohols, ethers, acetone, benzene, etc.

The following examples illustrate several embodiments of the process for preparing the esters of bis-dithiocarbamates.

EXAMPLE 1

*Bis-2-hydroxyethyl ethylene bis-dithiocarbamate*

To a constantly stirred mixture prepared from 0.25 mole of disodium ethylene bis-dithiocarbamate and 200 ml. of water is added 0.5 mole of ethylene chlorohydrin slowly over a period of 20-30 minutes. After addition of all the ethylene chlorohydrin the reaction mixture is stirred for 3.5 hours keeping the temperature between 30-40° C. At this point the reaction mixture is extracted with several portions of ether. The combined ether extracts are dried over anhydrous sodium sulfate and the ether distilled. The crude material remaining is triturated rapidly with petroleum ether until crystallization takes place. The yellow colored crude product is purified by recrystallization from ethanol and water in the form of fine yellow crystals having a melting point of 71-73° C.

EXAMPLE 2

*Bis-3-hydroxypropyl ethylene bis-dithiocarbamate*

To a constantly stirred mixture prepared from 0.25 mole of disodium ethylene bis-dithiocarbamate and 200 ml. of water is added 0.5 mole of trimethylene chlorohydrin slowly over a period of 20-30 minutes. After addition of all the trimethylene chlorohydrin the reaction mixture is stirred for 3.5 hours. The reaction mixture is then cooled to 0° C. and very viscous oil separates from solution. The water is decanted off and the oil dissolved in warm isobutyl methyl carbinol and dried over anhydrous sodium sulfate and filtered. The isobutyl methyl carbinol is extracted with petroleum ether and

EXAMPLE 3

*Di-n-propyl ethylene bis-dithiocarbamate*

To a constantly stirred mixture prepared from 0.25 mole of disodium ethylene bis-dithiocarbamate and 200 ml. of water is added 0.5 mole of n-propyl bromide slowly over a period of 25–30 minutes. After addition of all the n-propyl bromide the reaction mixture is stirred for 3.5 hours. The reaction mixture is then cooled to 0° C. and a yellow crystalline precipitate separates. The precipitate is collected on a filter and purified by re-crystallization from ether in the form of bright yellow crystals melting at 44–46° C.

EXAMPLE 4

*Diallyl ethylene bis-dithiocarbamate*

To a constantly stirred mixture prepared from 0.25 mole of disodium ethylene bis-dithiocarbamate and 200 ml. of water is added 0.5 mole of allyl chloride, slowly over a period of 25–30 minutes keeping the mixture at 30–40° C. After addition of all the allyl chloride the reaction mixture is stirred for 1.5 hours. The reaction mixture is then extracted with several portions of ether. The combined ether extracts are dried over anhydrous sodium sulfate and filtered. The ether is evaporated with the last small amounts being removed under vacuum. The remaining purified product is a bright yellow viscous oil with an odor similar to garlic.

EXAMPLE 5

*Dibenzyl ethylene bis-dithiocarbamate*

To a constantly stirred mixture prepared from 0.25 mole of disodium ethylene bis-dithiocarbamate and 200 ml. of water is added 0.5 mole of benzyl chloride slowly over a period of 25–30 minutes keeping the mixture at 30–40° C. After the addition of all the benzyl chloride the reaction mixture is stirred for 2 hours and a light yellow precipitate separated. The precipitate is filtered and washed with 150 ml. of water. The product is purified by re-crystallization from acetone and water from which is obtained light yellow crystals of melting point 114–116° C.

EXAMPLE 6

*Bis(acetylmethyl) ethylene bis-dithiocarbamate*

In a 500 ml., three-necked flask, fitted with a mechanical stirrer, dropping funnel and thermometer, was placed a mixture of 64 gm. (0.25 mole) of disodium ethylene bis-dithiocarbamate and 150 ml. of water. Chloro-2-propanone, 46 gm., (0.50 mole) was added slowly over a period of ten to fifteen minutes to the constantly stirred mixture which was kept at a temperature of 30°–40° C. After the addition of the chloro-2-propanone, the reaction mixture was stirred for twenty-five to thirty minutes during which time a light-tan precipitate separated. The precipitate was collected by filtration and washed twice with 50 ml. portions of cold water. The product was purified by re-crystallizing three times from a cyclohexanone n-pentane mixture. The product was then dried in vacuum for three hours at 60° C. The yield was 22 gm. (54.3%) of the ester which melted at 230°–232° C. with decomposition.

*Analysis.*—Calculated N 8.64%. Found N 8.55%.

EXAMPLE 7

*Bis(formylmethyl) ethylene bis-dithiocarbamate*

In a 500 ml., three-necked flask fitted with a mechanical stirrer, dropping funnel and thermometer was placed a mixture of 64 gm. (0.25 mole) of disodium ethylene bis-dithiocarbamate and 150 ml. of water. Chloro-acetaldehyde, 39.25 gm. (0.50 mole), was added slowly over a one hour period to the constantly stirred mixture which was maintained at a temperature of 5°–10° C. At the end of this time a tan syrupy mass had separated along with a smaller amount of a brown tarlike material. The tan material was dissolved in acetone, decolorized with charcoal and then re-crystallized three times from an acetone-water solution. The product was then dried in vacuum at 40° C. for twenty-four hours. The yield was 12 gm. (16.3%) of the ester which melted at 170° C. with decomposition.

*Analysis.*—Calculated N 9.46%. Found N 9.53%.

EXAMPLE 8

*Bis(carbethoxymethyl)ethylene bis-dithiocarbamate*

In a 500 ml., three-necked flask, fitted with a mechanical stirrer, dropping funnel and thermometer, was placed a mixture of 64 gm. (0.25 mole) of disodium ethylene bis-dithiocarbamate and 150 ml. of water. Ethyl bromoacetate, 83.5 gm. (0.50 mole), was added slowly over a thirty-minute period to the constantly stirred mixture which was maintained at a temperature of 10°–15° C. Stirring was continued for one hour, during which time the reaction mixture became neutral to litmus and a light-yellow precipitate separated. The precipitate was collected by filtration and washed twice with 50 ml. of cold water. The product was re-crystallized three times from an acetone-n-pentane solution. The ester was a fluffy, white, crystalline material. The yield was 30 gm. (31.3%) of the ester which melted at 121°–123° C.

*Analysis.*—Calculated N 7.28%. Found N 7.26%.

EXAMPLE 9

*Bis(polyethylene glycol) ethylene bis-dithiocarbamate (aver. M.W. 560)*

In a 500 ml., three-necked flask, fitted with a mechanical stirrer, dropping funnel and thermometer, was placed a mixture of 64 gm. (0.25 mole) of disodium ethylene bis-dithiocarbamate and 150 ml. of water. Polyethylene glycol chloride 210\*, 105 gm. (0.50 mole), was added in one lot. The reaction mixture was then heated to 65° C. and stirred constantly for three hours after which it was then cooled to 50° C. The ester was then separated by salting out with sodium chloride. The ester which was a dark-brown oil, was then dissolved in cyclohexanone, dried over anhydrous sodium sulfate for forty-eight hours and filtered. The cyclohexanone was then removed from the ester by repeated extraction with n-pentane. After separation, the ester was dried in vacuum at 60°–65° C. The yield was 60 gm. (42.8%) of the ester.

*Analysis.*—Calculated N 5.01%. Found N 4.78%.

EXAMPLE 10

*Bis(polyethylene glycol) ethylene bis-dithiocarbamate (aver. M. W. 960)*

In a 500 ml., three-necked flask, fitted with a mechanical stirrer, dropping funnel and thermometer, was placed a mixture of 64 gm. (0.25 mole) of disodium ethylene bis-dithiocarbamate and 100 ml. of water. Polyethylene glycol chloride 410\*, 205 gm. (0.50 mole), was added in one lot. The reaction mixture was heated to 70° C. and stirred constantly for four hours. Cyclohexanone, 150 ml. was then added to the reaction mixture and the sodium

---

\* Product of Carbide and Carbon Chemicals Co.

chloride was removed by filtration. The cyclohexanone-ester solution was then dried over anhydrous sodium sulfate for forty-eight hours and filtered. The cyclohexanone was then removed from the ester by repeated extraction with n-pentane. After separation the ester was dried in vacuum at 65°–70° C. for four hours. The yield was 203 gm. (84.5%) of the ester.

*Analysis.*—Calculated N 3.1%. Found N 3.0%.

EXAMPLE 11

*Bis(2-methylallyl) ethylene bis-dithiocarbamate*

In a 500 ml., three-necked flask, fitted with a mechanical stirrer, dropping funnel and thermometer, was placed a mixture of 64 gm. (0.25 mole) of disodium ethylene bis-dithiocarbamate and 150 ml. of water. To this constantly stirred mixture was added 45.25 gm. (0.50 mole) of 3-chloro-2-methyl propene over a period of twenty minutes. The mixture was then heated slowly to 45° C. and stirring continued for two hours, during which time a yellow metastable oil separated. The oil was removed and washed twice with 50 ml. portions of water and then dried in vacuum at 40° C. for forty-eight hours, during which time crystallization took place. The product was purified by recrystallizing twice from acetone. The yield was 27 gm. (33.8%) of the ester, a pale-yellow material melting at 58°–60°.

*Analysis.*—Calculated N 8.75%. Found N 8.76%.

EXAMPLE 12

*Bis(p-chlorobenzyl) ethylene bis-dithiocarbamate*

In a 500 ml., three-necked flask, fitted with a mechanical stirrer, dropping funnel and thermometer, was placed a mixture of 51.2 gm. (0.20 mole) of disodium ethylene bis-dithiocarbamate and 150 ml. of water. To this mixture was added 64.4 gm. (0.40 mole) of p-chlorobenzyl chloride. The reaction mixture was heated to 60° C. and stirred constantly for two hours, during which time a precipitate separated. The precipitate was collected by filtration, washed with three 50 ml. portions of water, then air dried. The product was then recrystallized four times from a solution of dioxane and n-pentane. The ester was a white, crystalline material. The yield was 24 gm. (24.2%) of the ester which melted at 143°–145° C.

*Analysis.*—Calculated N 5.64%. Found N 5.64%.

EXAMPLE 13

*Bis(2,4-dichlorobenzyl) ethylene bis-dithiocarbamate*

In a 500 ml., three-necked flask, fitted with a mechanical stirrer, dropping funnel and thermometer, was placed a mixture of 51.2 gm. (0.20 mole) of disodium ethylene bis-dithiocarbamate and 150 ml. of water. To this mixture was added 78.2 gm. (0.40 mole) of 2,4-dichloro-benzyl chloride. The reaction mixture was heated to 60° C. and stirred constantly for four hours during which time an oily material separated. The oil was collected by decanting the mother liquid and washed three times with water. After drying the oil in vacuum, it was triturated rapidly with n-pentane for two to three hours, during which time crystallization took place. The ester was then re-crystallized four times from a solution of dioxane and n-pentane. The ester was a yellow, crystalline product melting at 110°–112° C. The yield was 13 gm. (12.3%).

*Analysis.*—Calculated N 5.30%. Found N 5.30%.

EXAMPLE 14

*Bis(3,4-dichlorobenzyl) ethylene bis-dithiocarbamate*

In a 500 ml., three-necked flask fitted with a mechanical stirrer, dropping funnel and thermometer, was placed a mixture of 5.12 gm. (0.20 mole) of disodium ethylene bis-dithiocarbamate and 150 ml. of water. To this mixture was added 78.2 gm. (0.40 mole) of 3,4-dichloro-benzyl chloride. The reaction mixture was heated to 60° C. and stirred constantly for three hours, during which time a thick yellow oil separated and the mixture became neutral to litmus. The oil was collected by decanting the mother liquor and then washed three times with 50 ml. portions of water. The product was dried in vacuum for forty-eight hours and then triturated rapidly for two to three hours with n-pentane, during which time crystallization took place. The product was then re-crystallized four times from a solution of dioxane and n-pentane. The ester was a yellow, crystalline product melting at 118°–120° C. The yield was 35 gm. (33%).

*Analysis.*—Calculated N 5.30%. Found N 5.29%.

EXAMPLE "A"

*Disodium-2-hydroxytrimethylene-1, 3-bis-dithiocarbamate*

In a 500 ml., three-necked flask, a solution of 45.06 gm. (0.50 mole) of 1,3-diamino-2-propanol in 150 ml. of ethanol was cooled in an ice-water bath to 30° C. A solution of 40 gm. (1.0 mole) of sodium hydroxide in 40 ml. of water was cooled to to 30° C. and added in one lot to the solution of 1,3-diamino-2-propanol. The flask was then fitted with a reflux condenser, mechanical stirrer and a 100 ml. dropping funnel. Cooling was continued and 80 gm. (1.05 moles) of carbon disulfide was added dropwise over a period of thirty to forty minutes with constant stirring. After the addition of the carbon disulfide, the mixture was stirred vigorously for three hours, during which time it became a dark brown solution. This solution was used for the preparation of the 2-hydroxy trimethylene-1, 3-bis-dithiocarbamate esters.

EXAMPLE 15

*Dibenzyl-2-hydroxytrimethylene-1, 3-bis-dithiocarbamate*

In a 500 ml., three-necked flask, fitted with a mechanical stirrer, dropping funnel and thermometer, was placed a solution of approximately 0.25 mole of disodium-2-hydroxytrimethylene-1, 3-bis-dithiocarbamate in 150 ml. of water. To this was added 0.50 mole of benzyl chloride dropwise over a fifteen to twenty minute period while stirring constantly. Stirring was continued and the temperature of the reaction mixture rose to 45° C. After one hour, a dark-green mass had precipitated from solution. The precipitate was separated by filtration and washed twice with 150 ml. portions of water. The product was then dissolved in acetone and re-crystallized by addition of n-pentane. This was repeated three times and the product was then dried in vacuum at 60° C. for four hours. The ester was a very viscous yellow oil with the odor of leek. The yield was 57 gm. (57%).

*Analysis.*—Calculated N 6.65%. Found N 6.70%.

EXAMPLE 16

*Bis(acetylmethyl)-2-hydroxytrimethylene-1, 3-bis-dithiocarbamate*

In a 500 ml., three-necked flask fitted with a mechanical stirrer, dropping funnel and thermometer, was placed a solution of approximately 0.25 mole of disodium -2-hydroxytrimethylene-1, 3-bis-dithiocarbamate in 150 ml. of alcohol and water. To this constantly stirred solution, maintained at 25° C., 46 gm. (0.5 mole) of chloro-2-propanone was added dropwise over a thirty minute period. The reaction was completed at this time and the product had separated as a dark green metastable oil at the bottom of the reaction flask. The mixture was cooled at 10° C. and the mother liquor poured off. The oil was dissolved in acetone and water was then added until the solution was slightly cloudy. After 36 hours the product separated as a tan, crystalline solid. The ester was collected by filtration, air dried and then re-crystallized three times from a mixture of cyclohexanone and n-pentane. It was then dried in a vacuum oven for seventy-two hours at 40° C. The yield was 49 gm. (55.4%). The melting point was 151°–153° C.

Analysis.—Calculated N 7.91%. Found N 8.33%.

EXAMPLE 17

*Bis(carbethoxymethyl)-2-hydroxytrimethylene-1, 3-bis-dithiocarbamate*

In a 500 ml., three-necked flask fitted with a mechanical stirrer, dropping funnel and thermometer, was placed a solution of approximately 0.25 mole of disodium -2-hydroxytrimethylene-1, 3-bis-dithiocarbamate in 150 ml. of alcohol and water. To this constantly stirred solution, maintained at 0°–5° C., 83.5 gm. (0.5 mole) of ethyl bromoacetate was added dropwise over a twenty-minute period. Stirring was continued for one hour, during which time the reaction mixture became neutral to litmus and a dark-green mass precipitated. The mixture was cooled to 10° C. and the mother liquor poured off. The product was washed twice with 50 ml. portions of water, air dried and re-crystallized three times from a mixture of cyclohexanone and n-pentane. It was then dried in vacuum for seventy-two hours at 40° C. The yield was 20 gm. (19.3%) of the ester which melted at 151°–153° C.

Analysis.—Calculated N 6.8%. Found N 7.3%.

EXAMPLE "B"

*Sodium dithiocarbanilate*

In a 500 ml., three-necked flask, a solution of 93 gm. (1.0 mole) of aniline in 150 ml. of ethanol, was cooled in an ice-water bath of 25° C. A solution of 40 gm. (1.0 mole) of sodium hydroxide in 40 ml. of water was cooled to 30° C. and added in one lot to the cooled solution of aniline. The flask was then fitted with a reflux condenser, mechanical stirrer and a dropping funnel. Cooling was continued and 80 gm. (1.05 moles) of carbon disulfide was added dropwise over a period of one hour with constant stirring. After the addition of the carbon disulfide the reaction mixture was stirred vigorously for four hours. At this time 300 ml. of ether was added to the reaction mixture to precipitate the salt. The salt was separated by filtration, washed twice with 150 ml. portions of ether and air dried. This salt was used in the following three reactions.

EXAMPLE 18

*The reaction between sodium dithiocarbanilate and allyl chloride*

In a 500 ml., three-necked flask, fitted with a mechanical stirrer, dropping funnel and thermometer, was placed a solution of 47.8 gm. (0.25 mole) of sodium dithiocarbanilate in 150 ml. of water. To this constantly stirred solution, 19.12 gm. (0.25 mole) of allyl chloride was added dropwise over a period of twenty minutes. Stirring was continued and after thirty minutes a white precipitate had separated. The precipitate was separated by filtration, washed twice with 150 ml. portions of water and then re-crystallized twice from an acetone-water solution. The product was then dried in vacuum for eight hours at 50° C. The nitrogen content was found to be 12.27%.

The compound was obviously not an ester of dithiocarbanilic acid. The nitrogen content and melting point were the same as those of N,N'-diphenyl thiourea and a mixed melting point taken with a known sample of N,N'-diphenyl thiourea was also 154° C. The compound was thus presumed to be N,N'-diphenyl thiourea.

EXAMPLE 19

*The reaction between sodium dithiocarbanilate and chloro-2-propanone*

In a 500 ml., three-necked flask, fitted with a mechanical stirrer, dropping funnel and thermometer, was placed a solution of 47.8 gm. (0.25 mole) of sodium dithiocarbanilate in 150 ml. of water. To this constantly stirred solution, maintained at 25° C., 23 gm. (0.25 mole) of chloro-2-propanone was added dropwise over a period of 20 minutes. Stirring was continued and after thirty minutes a tan precipitate had separated. The precipitate was separated by filtration, washed with three 150 ml. portions of water and then re-crystallized three times from an acetone-water solution. The product was then dried in vacuum for forty-eight hours at 40° C. The yield was 40 gm. of a compound melting at 170° C. The nitrogen content was 7.4% as compared to 6.2% required for the ester.

The compound was probably not the desired ester of dithiocarbanilic acid but was kept for antifungal testing.

EXAMPLE 20

*The reaction between sodium dithiocarbanilate and ethyl bromoacetate*

In a 500 ml., three-necked flask, fitted with a mechanical stirrer, dropping funnel and thermometer, was placed a solution of 47.8 gm. (0.25 mole) of sodium dithiocarbanilate in 150 ml. of water. To this constantly stirred solution, maintained at 25° C., 41.8 gm. (0.25 mole) of ethyl bromoacetate was added dropwise over a period of 30 minutes. Stirring was continued and after one hour a pink metastable oil had separated. The mother liquor was poured off the oil and the oil washed three times with 100 ml. portions of water. The product was then dried in vacuum at 40° C. for forty-eight hours during which time crystallization took place. The compound was then recrystallized three times from water and acetone. The yield was 38 gm. of a compound melting at 120°–122° C. The nitrogen content was found to be 6.4% as compared to 5.5% required for the ester. The compound was apparently not the desired ester of dithiocarbanilic acid but was kept for antifungal testing.

The above examples of processes for preparing the condensation reaction product of this invention are not intended to limit one to the exact conditions illustrated therein, as it may be readily understood that variations in the processes and procedures are possible without effecting the results. While in each of the above examples the dimetallic bis-dithiocarbamate is placed in water and has the organic halide added thereto, the water may be replaced in part or completely by alcohol, acetone, benzol, chloroform, etc. Also, while the disodium salt of ethylene bis-dithiocarbamate is used in each of the above examples, other dimetallic bis-dithiocarbamate salts such as potassium, ammonium, lithium, calcium and the like may be used. With sparingly soluble dimetallic salts, examples of which are zinc, copper, cadmium and iron, the reaction is much slower and the yield much smaller.

The term "organic halide" as used herein includes, in addition to the specific halides disclosed in the above examples, the following: benzoyl chloride, acetyl chloride, phenacyl bromide, p-nitro phenacyl bromide and other substituted phenacyl halides, halogenated ketones such as chloro-2-propanone, 3,4-dichlorbenzyl chloride, 2,4-dichlorbenzyl chloride, orthochlor benzyl chloride, monochloro acetic acid, monochloro propionic acids, 2,4-dinitro chlorobenzene, picryl chloride, aromatic sulfonyl halides such as benzene sulfonyl chloride, and other radicals containing reactive halogens.

The following table illustrates the effect of each of the condensation reaction products formed in Examples 1 to 5 inclusive on particular micro-organisms and the effect is compared with undecylenic acid, a compound presently in common use as a fungicide for these micro-organisms.

TABLE I.—WIDTH OF ZONE OF INHIBITION IN MILLIMETERS

| Organism | Undecylenic acid | Diallyl ester | Dibenzyl ester | Bis-2-hydroxyethyl ester | Bis-3-hydroxypropyl ester | Di-n-propyl ester | Acetone |
|---|---|---|---|---|---|---|---|
| M. audouini | 21<br>26<br>27<br>28 | 40<br>38<br>37<br>31 | 21<br>15<br>15<br>15 | 25<br>21<br>15<br>17 | 26<br>15<br>13<br>13 | 26<br>26<br>30<br>28 | 0<br>0<br>0<br>0 |
| Aver | 25.4 | 36.3 | 16.5 | 19.5 | 16.7 | 27.5 | 0 |
| A. schoenleinii | 52<br>46<br>47 | 60<br>49<br>55 | 32<br>31<br>26 | 44<br>33<br>45 | 31<br>30<br>30 | 40<br>35<br>35 | 0<br>0<br>0 |
| Aver | 48.3 | 54.7 | 26.3 | 40.7 | 30.3 | 36.7 | 0 |
| M. lanosum | 34<br>36 | 63<br>50 | 25<br>28 | 43<br>47 | 41<br>36 | 34<br>38 | 0<br>0 |
| Aver | 35 | 56.5 | 26.5 | 45 | 38.5 | 36 | 0 |
| M. gypseum | 50<br>45<br>42 | 65<br>64<br>60 | 21<br>21<br>30 | 46<br>55<br>56 | 32<br>50<br>50 | 44<br>52<br>48 | 0<br>0<br>0 |
| Aver | 45.7 | 63 | 24 | 52.3 | 47.3 | 48 | 0 |
| T. rubrum | 49<br>54<br>54 | 63<br>47<br>55 | 28<br>25<br>17 | 49<br>52<br>50 | 30<br>50<br>60 | 40<br>40<br>41 | 0<br>0<br>0 |
| Aver | 52.3 | 55 | 23.7 | 50.3 | 46.7 | 40.3 | 0 |

The esters formed in the remaining examples above were tested on other micro-organisms for determination of their fungicidal action and the results compared with undecylenic acid and with acetone. These results are set forth in Tables II, III and IV. The compounds set forth and compared in Tables II, III and IV are referred to by numbers which correspond to the following numbered compounds:

(1) Bis(2-methylallyl) ethylene bis-dithiocarbamate
(2) Bis(acetylmethyl) ethylene bis-dithiocarbamate
(3) Bis(3,4-dichlorobenzyl) ethylene bis-dithiocarbamate
(4) Bis(p-chlorobenzyl) ethylene bis-dithiocarbamate
(5) Bis(2,4-dichlorobenzyl) ethylene bis-dithiocarbamate
(6) Bis(formylmethyl) ethylene bis-dithiocarbamate
(7) Bis(carbethoxymethyl) ethylene bis-dithiocarbamate
(8) Bis(acetylmethyl)-2-hydroxytrimethylene-1, 3-bis-dithiocarbamate
(9) Bis(carbethoxymethyl)-2-hydroxytrimethylene-1, bis-dithiocarbamate
(10) Dibenzyl-2-hydroxytrimethylene-1, 3-bis-dithiocarbamate
(11) Bis(polyethyleneglycol) ethylene bis-dithiocarbamate (aver. M.W. 960)
(12) Bis(polyethyleneglycol) ethylene bis-dithiocarbamate (aver. M.W. 560)
(13) Reaction product of sodium dithiocarbanilate and chloro-2-propanone
(14) Reaction product of sodium dithiocarbanilate and ethyl bromoacetate
(15) Undecylenic acid
(16) Acetone

TABLE II.—WIDTH OF ZONE OF INHIBITION IN MILLIMETERS, AGENTS AT 5% CONCENTRATION

| Organism | Compound Number | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| M. canis | 35<br>33<br>42<br>41<br>38 | 43<br>41<br>35<br>42<br>39 | 32<br>27<br>33<br>31<br>31 | 24<br>25<br>25<br>23<br>23 | 23<br>24<br>24<br>24<br>26 | 30<br>23<br>23<br>25<br>23 | 32<br>32<br>36<br>40<br>38 | 32<br>32<br>42<br>43<br>35 | 28<br>31<br>25<br>32<br>33 | 34<br>25<br>25<br>23<br>32 | 26<br>25<br>24<br>22<br>24 | 45<br>43<br>37<br>38<br>41 | 40<br>40<br>35<br>35<br>40 | 33<br>35<br>41<br>41<br>37 | 50<br>50<br>40<br>45<br>47 | 0<br>0<br>0<br>0<br>0 |
| Aver | 37.8 | 40 | 30.8 | 24 | 24.2 | 24.8 | 35.6 | 37.8 | 29.8 | 27.8 | 24.2 | 40.8 | 38 | 37.4 | 46.4 | 0 |
| M. gypseum | 30<br>28<br>27<br>32<br>30 | 27<br>30<br>31<br>28<br>30 | 30<br>30<br>25<br>20<br>22 | 13<br>13<br>16<br>16<br>15 | 24<br>24<br>19<br>18<br>18 | 18<br>18<br>20<br>20<br>19 | 29<br>27<br>34<br>37<br>44 | 25<br>25<br>24<br>23<br>24 | 32<br>33<br>21<br>20<br>23 | 20<br>20<br>13<br>13<br>18 | 15<br>18<br>27<br>21<br>19 | 23<br>25<br>27<br>25<br>35 | 26<br>26<br>24<br>25<br>25 | 17<br>18<br>32<br>32<br>21 | 25<br>25<br>27<br>35<br>40 | 0<br>0<br>0<br>0<br>0 |
| Aver | 29.4 | 29.2 | 25.4 | 14.6 | 20.6 | 19 | 34.2 | 24.2 | 25.8 | 16.8 | 20 | 27 | 25 | 24 | 30.4 | 0 |
| M. audouini | 21<br>27<br>23<br>25<br>25 | 28<br>32<br>34<br>35<br>31 | 14<br>14<br>13<br>15<br>13 | 13<br>13<br>13<br>13<br>13 | 15<br>15<br>14<br>16<br>15 | 15<br>15<br>15<br>15<br>15 | 16<br>16<br>17<br>15<br>17 | 14<br>17<br>17<br>16<br>16 | 14<br>14<br>15<br>13<br>15 | 13<br>13<br>13<br>13<br>13 | 13<br>13<br>13<br>13<br>13 | 13<br>13<br>13<br>13<br>13 | 13<br>13<br>13<br>13<br>13 | 16<br>16<br>15<br>17<br>16 | 28<br>30<br>27<br>29<br>32 | 0<br>0<br>0<br>0<br>0 |
| Aver | 24.2 | 32 | 13.8 | 13 | 15 | 15 | 16.2 | 16.4 | 14.2 | 13 | 13 | 13 | 13 | 16 | 29.2 | 0 |
| T. mentagrophytes | 38<br>35<br>29<br>29<br>40 | 60<br>58<br>60<br>65<br>60 | 25<br>25<br>36<br>36<br>35 | 13<br>13<br>15<br>16<br>18 | 23<br>23<br>30<br>35<br>25 | 23<br>23<br>28<br>25<br>27 | 48<br>48<br>28<br>40<br>42 | 29<br>28<br>39<br>38<br>29 | 33<br>31<br>35<br>35<br>33 | 39<br>35<br>35<br>39<br>40 | 39<br>30<br>40<br>40<br>35 | 38<br>47<br>40<br>40<br>40 | 30<br>30<br>20<br>20<br>26 | 38<br>38<br>30<br>30<br>36 | 60<br>60<br>60<br>60<br>60 | 0<br>0<br>0<br>0<br>0 |
| Aver | 34.2 | 60.6 | 31.4 | 15 | 27.2 | 25.2 | 41.2 | 32.6 | 33.4 | 37.6 | 36.8 | 42.2 | 25.2 | 34.4 | 60 | 0 |

TABLE III.—WIDTH OF ZONE OF INHIBITION IN MILLIMETERS, AGENTS AT 2½% CONCENTRATION

| Organism | Compound Number | | | | | | | |
|---|---|---|---|---|---|---|---|---|
| | 1 | 2 | 7 | 12 | 13 | 14 | 15 | 16 |
| M. canis | 32<br>30<br>28<br>30<br>28 | 20<br>21<br>17<br>16<br>18 | 32<br>35<br>35<br>35<br>34 | 25<br>25<br>24<br>22<br>23 | 20<br>19<br>24<br>19<br>21 | 25<br>30<br>25<br>22<br>24 | 35<br>29<br>35<br>28<br>29 | 0<br>0<br>0<br>0<br>0 |
| Average | 29.6 | 18.4 | 34.2 | 23.8 | 20.6 | 25.2 | 31.2 | 0 |
| M. gypseum | 28<br>22<br>29<br>23<br>30 | 20<br>25<br>20<br>19<br>21 | 30<br>34<br>40<br>37<br>33 | 20<br>20<br>18<br>17<br>20 | 20<br>22<br>20<br>19<br>20 | 20<br>28<br>23<br>25<br>25 | 32<br>25<br>28<br>31<br>33 | 0<br>0<br>0<br>0<br>0 |
| Average | 26.4 | 21 | 34.8 | 19 | 20.2 | 24.2 | 29.8 | 0 |
| M. audouini | 13<br>14<br>13<br>14<br>14 | 13<br>15<br>17<br>16<br>15 | 13<br>13<br>13<br>13<br>13 | 13<br>13<br>13<br>13<br>13 | 13<br>13<br>13<br>13<br>13 | 13<br>15<br>14<br>14<br>13 | 16<br>17<br>14<br>14<br>16 | 0<br>0<br>0<br>0<br>0 |
| Average | 13.6 | 15.2 | 13 | 13 | 13 | 13.8 | 15.4 | 0 |
| T. mentagrophytes | 35<br>38<br>40<br>35<br>45 | 28<br>32<br>26<br>31<br>30 | 20<br>24<br>22<br>25<br>21 | 13<br>17<br>14<br>16<br>14 | 20<br>19<br>21<br>19<br>21 | 25<br>25<br>24<br>23<br>24 | 36<br>30<br>35<br>37<br>40 | 0<br>0<br>0<br>0<br>0 |
| Average | 38.6 | 29.4 | 22.4 | 14.8 | 20 | 24.2 | 35.6 | 0 |

TABLE IV.—WIDTH OF ZONE OF INHIBITION IN MILLIMETERS, AGENTS AT 1% CONCENTRATION

| Organism | Compound Number | | | | | | | |
|---|---|---|---|---|---|---|---|---|
| | 1 | 2 | 7 | 12 | 13 | 14 | 15 | 16 |
| M. canis | 27<br>27<br>30<br>30<br>28 | 15<br>13<br>17<br>16<br>17 | 32<br>35<br>33<br>30<br>34 | 17<br>13<br>13<br>16<br>14 | 19<br>19<br>18<br>20<br>21 | 15<br>17<br>13<br>13<br>18 | 18<br>17<br>13<br>13<br>13 | 0<br>0<br>0<br>0<br>0 |
| Average | 28.4 | 15.6 | 32.8 | 14.6 | 19.4 | 15.2 | 14.8 | 0 |
| M. gypseum | 30<br>25<br>22<br>23<br>26 | 18<br>19<br>20<br>17<br>18 | 23<br>21<br>24<br>20<br>21 | 13<br>14<br>17<br>15<br>17 | 13<br>13<br>15<br>17<br>16 | 13<br>13<br>17<br>16<br>13 | 20<br>20<br>21<br>21<br>24 | 0<br>0<br>0<br>0<br>0 |
| Average | 25.2 | 18.4 | 21.8 | 15.2 | 14.8 | 14.4 | 21.2 | 0 |
| M. audouini | 13<br>13<br>13<br>13<br>13 | 13<br>13<br>13<br>13<br>13 | 13<br>13<br>13<br>13<br>13 | 13<br>13<br>13<br>13<br>13 | 13<br>13<br>13<br>13<br>13 | 13<br>13<br>13<br>13<br>13 | 13<br>13<br>13<br>13<br>13 | 0<br>0<br>0<br>0<br>0 |
| Average | 13 | 13 | 13 | 13 | 13 | 13 | 13 | 0 |
| T. mentagrophytes | 35<br>37<br>34<br>33<br>34 | 29<br>26<br>30<br>27<br>29 | 19<br>22<br>25<br>21<br>21 | 13<br>13<br>13<br>13<br>13 | 13<br>14<br>15<br>13<br>14 | 13<br>13<br>13<br>13<br>13 | 25<br>28<br>30<br>23<br>23 | 0<br>0<br>0<br>0<br>0 |
| Average | 34.6 | 28.2 | 21.6 | 13 | 13.8 | 13 | 25.8 | 0 |

The culture medium used in obtaining the results in the above tables was Sabouraud's dextrose agar maintained at a pH of 5.6 to prevent bacterial contamination. Water suspensions of spores of the test organisms indicated in the tables were prepared from 14 to 21 day Sabouraud's dextrose agar slant cultures which had been incubated at 28° C. The suspensions were prepared by grinding the growing colonies in the slant tube with a ground-glass rod. Fifteen milliliters of sterile water for injection at 60° C. were then added and suspension of the spores brought about by vigorous agitation. The antifungal agents were prepared for use in the experiment by making up weight to volume solutions of each agent in acetone.

The method of testing consisted of pipetting 20 ml. of the culture medium into a sterile petri dish and allowing the medium to harden. After solidification of the agar, one milliliter of the water suspensions of the spores was streaked on each plate. All plates in a series were inoculated from the same spore suspension so as to insure a nearly uniform number of spores in each plate. The petri dishes, when ready for use, thus contain a thin upper layer in which the fungus cells were embedded and a 20 milliliter base layer below.

To test each particular fungicide sterile filter paper disks, 13 mm. in diameter, were placed in the acetone solution containing the fungicide. These disks were then picked up with sterile forceps, and the excess liquid drained off by touching the disk to the wall of the container. The disk was then immediately dropped onto the agar surface. After a constant incubation at 37° C., for seven days the diameter of the zones of inhibition were measured and recorded. A control plate for each series using acetone was included in all of the observations.

The results of these experiments are recorded in Tables II, III and IV.

The bis-dithiocarbamate esters formed in the above examples range from a light yellow nearly odorless solid with the dibenzyl ester to a rather thick yellow oil-like compound of garlic odor with the diallyl ester. The range of properties of these compounds permits their use in a wide variety of fungicidal, germicidal, bactericidal and antiseptic types of preparations and also as preservative agents. They may be used in solid form, in solution, in emulsion and combined with other active or inert ingredients to make sprays and preservative paints. The condensation products, namely, the esters of the bis-dithiocarbamates may be practicably applied to the desired surfaces in solutions or suspensions made in alcohol, water, alcohol and water, acetone, acetone and water, isopropyl alcohol, isopropyl alcohol and water, propylene glycol, and other forms. Such solutions or suspensions may be used as fungicidal preparations to disinfect inanimate objects.

These new esters of bis-dithiocarbamate also have the advantage of being more stable than the corresponding dimetallic salts. The esters show only slight or no decomposition over periods ranging up to two years while the dimetallic salts may show considerable decomposition in three to six months. The dimetallic salts have been reported to be quite unstable in aqueous solutions and lose up to ninety percent of their activity in a short time. Aqueous suspension of the esters of this invention have given no evidence of decomposition. These condensation products are also advantageous in that they are fungicidal, as shown by the fact that transplants of media taken from zones of inhibition caused by the esters and fungus growth will not grow, whereas fatty acids, such as undecylenic acid are only weakly fungistatic.

It is to be understood that various changes, modifications, and departures from this specific disclosure may be made by those skilled in the art without departing from the scope and spirit of the invention as described herein and as defined in the appended claims.

Having fully described the invention, what is claimed is:

1. The process of inhibiting and destroying micro-organisms selected from the group consisting of *Microsporum audouini, M. gypseum, M. lanosum, M. canis, Trichophyton schoenleini, T. rubrum, T. mentagrophytes,* and *Staphylococcus aureus* comprising applying to the micro-organisms a fungicidal amount of alkylene bis-dithiocarbamate ester.

2. The process as defined in claim 1 wherein said ester is di-allyl ethylene bis-dithiocarbamate.

3. The process as defined in claim 1 wherein said ester is bis-2-hydroxyethyl ethylene bis-dithiocarbamate.

4. The process as defined in claim 1 wherein said ester is bis-(2 methyl allyl)-ethylene bis-dithiocarbamate.

5. The process as defined in claim 1 wherein said ester is bis-acetylmethyl ethylene bis-dithiocarbamate.

6. The process as defined in claim 1 wherein said ester is bis-(carbethoxymethyl) ethylene bis-dithiocarbamate.

References Cited in the file of this patent

UNITED STATES PATENTS

| | | |
|---|---|---|
| Re. 23,742 | Hester | Nov. 24, 1953 |
| 2,313,871 | Hanford et al. | Mar. 16, 1943 |
| 2,561,208 | Kirk | July 17, 1951 |
| 2,796,376 | Williams et al. | June 18, 1957 |

OTHER REFERENCES

Zinsser: Bacteriology, 11th ed., Appleton-Century Crofts, Inc., N.Y., 1957, pp. 873–880.

Collins: "Synthesis and Invest. of Some Bis-Dithiocarbamate Esters and Possible Fungicides," deposited in Lib. of Iowa State Univ., February 1954 (35 pp.).